United States Patent
Okamoto et al.

(10) Patent No.: US 7,804,616 B2
(45) Date of Patent: Sep. 28, 2010

(54) DATA TRANSMISSION APPARATUS, IMAGE DATA TRANSMISSION APPARATUS, AND PROGRAM

(75) Inventors: Yuji Okamoto, Kyoto (JP); Shuhji Fujii, Kyoto (JP); Syoichiro Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 284 days.

(21) Appl. No.: 11/985,807

(22) Filed: Nov. 16, 2007

(65) Prior Publication Data

US 2008/0117476 A1    May 22, 2008

(30) Foreign Application Priority Data

Nov. 20, 2006  (JP)  ............................. 2006-313038
Dec. 28, 2006  (JP)  ............................. 2006-354522

(51) Int. Cl.
G06F 3/12    (2006.01)
H04N 1/00    (2006.01)
H04N 1/40    (2006.01)
H04M 11/00   (2006.01)
H04M 1/00    (2006.01)

(52) U.S. Cl. ...................... 358/1.15; 358/400; 358/403; 358/404; 358/407; 358/440; 358/442; 358/444; 379/93.01; 379/100.05; 379/354

(58) Field of Classification Search ................ 358/1.15, 358/440, 403, 404, 407, 438, 442, 444, 400; 379/354, 310.01, 93.01, 100.05
See application file for complete search history.

(56) References Cited

U.S. PATENT DOCUMENTS 5,301,035 A * 4/1994 Hayafune ................... 358/440

6,330,080 B1   12/2001 Omori
7,369,281 B2 *  5/2008 Baba ........................ 358/442
2006/0070011 A1 * 3/2006 Matsuhara et al. .......... 715/816
2006/0140376 A1  6/2006 Yoshioka

FOREIGN PATENT DOCUMENTS

| JP | 02-246471 | 10/1990 |
| JP | 10-341305 | 12/1998 |
| JP | 11-225260 | 8/1999 |
| JP | 2004-241953 | 8/2004 |
| JP | 2006-166319 | 6/2006 |

* cited by examiner

Primary Examiner—Charlotte M Baker
(74) Attorney, Agent, or Firm—David G. Conlin; Steven M. Jensen; Edwards Angell Palmer & Dodge LLP

(57) ABSTRACT

A data transmission apparatus includes a holding portion that holds specified transmission destination information, and a control portion that controls the holding portion to keep holding the transmission destination information even after completion of data transmission based on the transmission destination information and stand by in a state of being capable of subsequently transmitting different data to the same transmission destination. The control portion permits or forbids holding of the transmission destination information based on the contents of data transmission. An image data transmission apparatus determines the presence or absence of a possibility that a set transmission destination is an erroneously set transmission destination. The image data transmission apparatus, after the start of image reading, requires a user to make a confirmation of correct setting of the transmission destination only when the possibility is present, and transmits stored image data to the transmission destination after the confirmation.

14 Claims, 7 Drawing Sheets

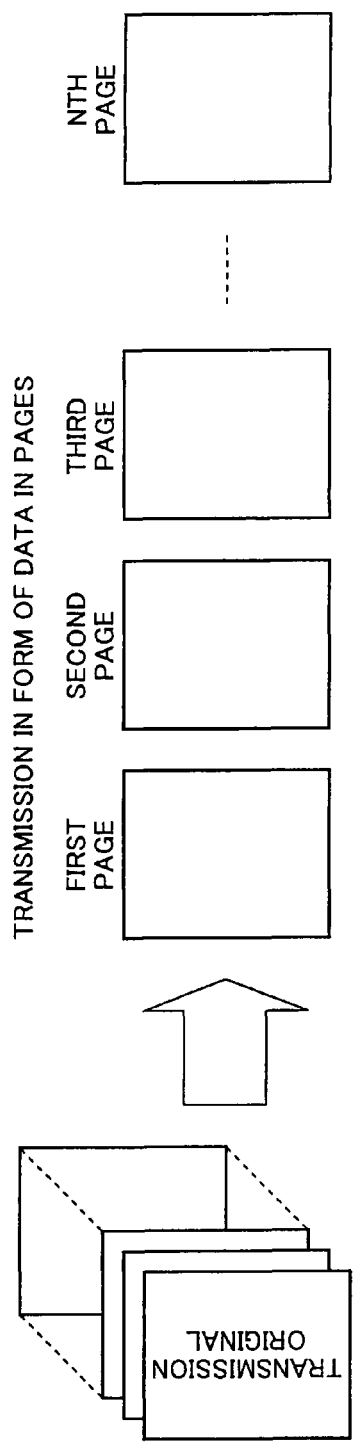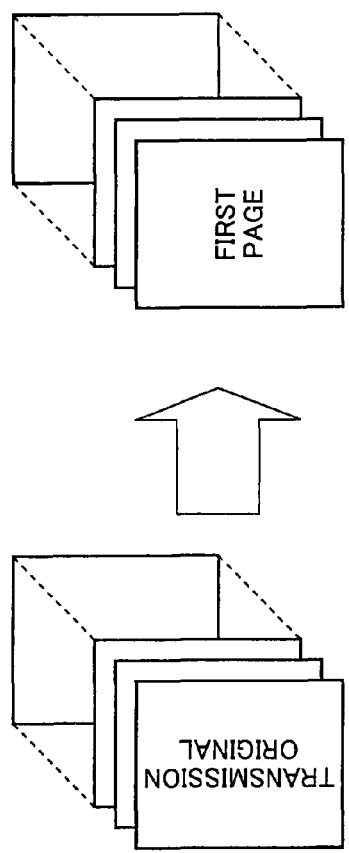

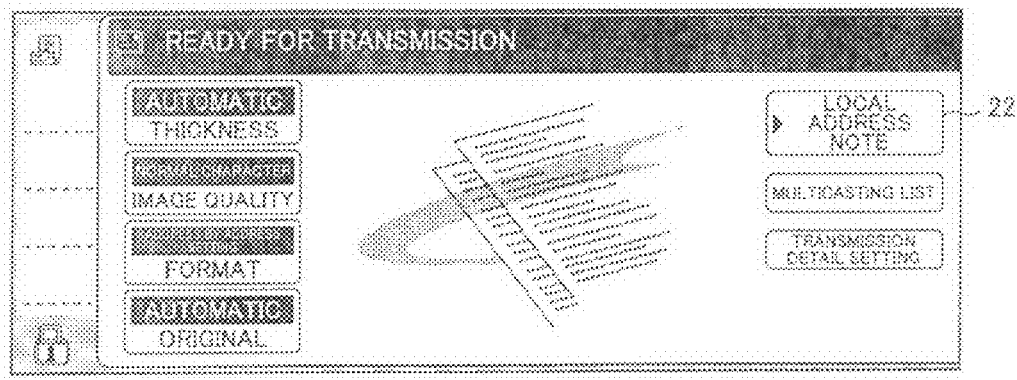

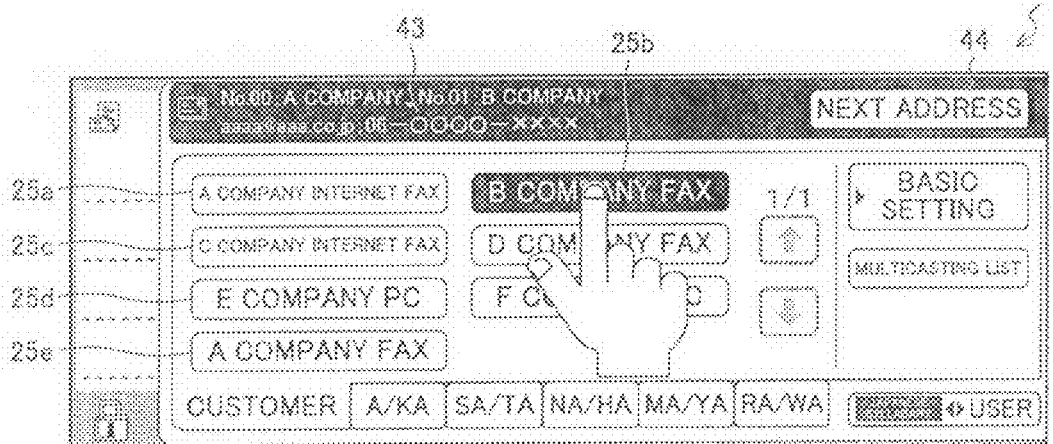

DATA TRANSMISSION APPARATUS, IMAGE DATA TRANSMISSION APPARATUS, AND PROGRAM

CROSS-NOTING PARAGRAPH

This Non-provisional application claims priority under 35 U.S.C. §119(a) on Patent Application No. 2006-313038 filed in JAPAN on Nov. 20, 2006 and No. 2006-354522 filed in JAPAN on Dec. 28, 2006, the entire contents of which are hereby incorporated herein by references.

FIELD OF THE INVENTION

The present invention relates generally to a data transmission apparatus, an image data transmission apparatus, and a program, and, more particularly, to a data transmission apparatus and an image data transmission apparatus that transmit data via a network, such as a facsimile apparatus and an e-mail transmission apparatus, and a program to be installed in the apparatuses.

BACKGROUND OF THE INVENTION

A conventional facsimile apparatus operates in such a way that when a user specifies (sets) a transmission destination, sets an original, and presses a start key, the facsimile apparatus transmits an original image read from a transmission original in pages (sequentially from 1 to N pages). Such facsimile transmission is carried out via a network using an audio line or ISDN line. When the user wants to transmit a different original image to the above transmission destination, the user cells to the transmission destination using a redial function to execute transmission.

A facsimile communication method related to retransmission of a different original image is disclosed in Japanese Laid-Open Patent Publication No. 1990-246471. According to the method, when a transmission destination of an original set on an original reading means matches a transmission destination of image data of image data accumulating means, either of the original and the image data is transmitted first and then the other is transmitted continuously without disconnecting the line. The process of this method applies to a specific case where the transmission destination of image data of image data accumulating means matches the transmission destination of the set original.

An apparatus carrying out data transmission via a network using the Internet protocol (IP) is in popular use. Such an apparatus includes, for example, an Internet facsimile apparatus that transmits read image data as an attached file of an e-mail, a scan file transmission apparatus that transmits read image data through a file transfer protocol (FTP), and an e-mail transmission apparatus that transmits an e-mail. Obviously, some data transmission apparatuses including image data transmission apparatuses do not depend on the IP-based network, but transmit data via a network based on a protocol other than the IP.

The above apparatuses transmit data in files when transmitting data resulting from original reading. For example, when a user specifies (sets) a transmission destination, sets an original, and presses a start key, the apparatus transmit an original image obtained by reading the transmission original in files (as a piece of data of N pages of the original). When the user wants to transmit a different original image to the transmission destination, the apparatus calls to the transmission destination to execute transmission in the same way as a redial function does.

Japanese Laid-Open Patent Publication No. 2004-241953 discloses a server apparatus capable of reconfirming the contents of a job process just before execution of a time-designated job and altering or canceling the contents when necessary.

SUMMARY OF THE INVENTION

In operating a conventional facsimile apparatus, when a user tries to transmit different facsimile data using the previous transmission destination, the user needs to carry out a call operation (specifying operation) of calling to the previous transmission destination using a redial function.

To save such a trouble of input operation, the facsimile apparatus may be configured in such a way that the facsimile apparatus stands by in a state of holding the previous transmission destination even after disconnection of the line to be able to transmit different facsimile data. In this case, however, the held previous transmission destination is so often different from the next transmission destination to follow not only when the user is replaced but also when the same user operates the apparatus. Such a configuration, therefore, brings a high possibility that the user carries out erroneous data transmission without noticing the difference between both transmission destinations, thus not realistic but is inconvenient.

The facsimile communication method described in Japanese Laid-Open Patent Publication No. 1990-246471 is executed on the assumption that both transmission destinations have already been input. Comparing both transmission destinations prevents erroneous data transmission, but calling to the previous transmission destination using the redial function upon inputting the next transmission destination does not change the fact that the operation of inputting or specifying both transmission destinations is necessary. The facsimile communication method, therefore, takes some trouble.

Meanwhile, another type of a data transmission apparatus transmitting data in files, such as a conventional Internet facsimile apparatus, has to transmits data one by one, which data is to be received at a transmission destination as one file. This is troublesome. In a case of transmitting data read from an original, particularly, a user has to execute operations of reading the original, specifying a transmission destination, and starting transmission in data processing in a desired data unit for reception. Contrary to that case, if the transmission side takes no trouble and processes all data at once, the reception side (may be a personal computer (PC) used by the user) has to take trouble of dividing received data in a desired data unit for management.

An apparatus transmitting data in files, therefore, should preferably be configured in such a way that the apparatus stands by in a state of holding the previous transmission destination to be able to transmit different data. A conventional data transmission apparatus, however, does not have such a configuration, and, therefore, requires a call operation (specifying operation) of calling to a transmission destination for every data transmission even if the next transmission destination to follow is identical with the previous transmission destination.

The problems described above become prominent particularly in a conventional data transmission apparatus, such as a multifunction peripheral, that has a data transmission function of transmitting data in pages and in files as well. Such a data transmission apparatus cannot simultaneously offer both features of preventing erroneous data transmission and of saving trouble of specifying a transmission destination upon transmitting data to the same transmission destination as the previous transmission destination.

An object of the present invention is to provide a data transmission apparatus and a program installed therein that can save trouble of specifying or inputting a transmission destination upon transmitting different data to the same transmission destination as the previous transmission destination while preventing erroneous data transmission.

To achieve the above object, a first technical means is a data transmission apparatus transmitting data to a transmission destination indicated by specified transmission destination information via a network, comprising: a holding portion holding the specified transmission destination information; and a control portion controlling the holding portion to cause the holding portion to keep holding the transmission destination information even after completion of transmission of the data based on the transmission destination information and stand by in a state of being capable of subsequently transmitting different data to the same transmission destination, wherein the control portion permits or forbids holding of the transmission destination information by the holding portion based on contents of transmission of the data based on the transmission destination information.

A second technical means is the data transmission apparatus of the first technical means, wherein the control portion forbids holding of the transmission destination information by the holding portion based on a data format of the data.

A third technical means is the data transmission apparatus of the first technical means, wherein the control portion forbids holding of the transmission destination information by the holding portion on condition that the data is processed in pages.

A fourth technical means is the data transmission apparatus of the first technical means, being capable of data transmission through a plurality of transmission paths for data transmission forms different from each other, wherein the control portion forbids holding of the transmission destination information by the holding portion based on a transmission path for the data.

A fifth technical means is the data transmission apparatus of the fourth technical means, wherein the plurality of transmission paths include a transmission path for data transmission in pages, and a transmission path for data transmission in a form of one file containing data of a plurality of pages.

A sixth technical means is the data transmission apparatus of the fifth technical means, wherein the control portion forbids holding of the transmission destination information by the holding portion on condition that the transmission path for data transmission in pages is used.

A seventh technical means is the data transmission apparatus of the first technical means, wherein the control portion forbids holding of the transmission destination information by the holding portion based on the transmission destination information for transmission of the data.

An eighth technical means is the data transmission apparatus of the first technical means, comprising a notice portion noticing a user that the transmission destination information is held by the holding portion.

A ninth technical means is the data transmission apparatus of the first technical means, comprising a use confirming portion that when the transmission destination information is held by the holding portion, requires a user to confirm whether or not use a transmission destination indicated by the held transmission destination information also for the different data, wherein the data transmission apparatus accepts addition of a new transmission destination only when the use confirming portion obtains a confirmation of use of the transmission destination.

A tenth technical means is a program installed in the data transmission apparatus of the first technical means, the program operable to drive an internal computer of the data transmission apparatus to function as the control portion.

A conventional image data transmission apparatus, such as a facsimile apparatus and Internet facsimile apparatus, brings a possibility that a user erroneously specifies a transmission destination or an additional transmission destination when the user tries to transmit different image data using the previous transmission destination.

Use of the previous transmission destination in a facsimile apparatus is not realized through a redial function, but, to save a user trouble, may be realized by configuring the facsimile apparatus in such a way that the facsimile apparatus stands by in a state of holding the previous transmission destination even after disconnection of the line to be able to transmit different facsimile data. In facsimile transmission, however, the reception side receives data in the form of paper after all. This means that executing original reading and data transmission all together will suffice for a case of data transmission to the same transmission destination.

Meanwhile, use of the previous transmission destination in another type of image data transmission apparatus, including a conventional Internet facsimile apparatus, that transmits data in files is not realized through a call function equivalent to the redial function, but, to save a user trouble, should preferably be realized by configuring the image data transmission apparatus in such a way that the apparatus stands by in a state of holding the previous transmission destination to be able to transmit different data. This configuration is effective for transmission in files because data to be received as one file at a transmission destination has to be transmitted one by one.

Adopting the above configuration causing the apparatus to stand by in a state of holding the previous transmission destination, however, brings a possibility that a user erroneously specifies a transmission destination or an additional transmission destination when the user tries to transmit different image data using the previous transmission destination. Such erroneous transmission destination setting happens prominently particularly in a conventional image data transmission apparatus, such as a multifunction peripheral, that has a data transmission function of transmitting data in pages and in files as well.

In data transmission in a facsimile apparatus that gives spare time between the start of original reading to the start of transmission, a user may notice an error in inputting a transmission destination, which is, however, a rare case because no conventional facsimile apparatus calls the user's attention in any particular manner. Another type of image data transmission apparatus transmitting data in files gives little spare time between the start of original reading and the start of transmission, so that a user rarely notices an error in inputting a transmission destination, and, even when noticing the error, the user cannot execute transmission canceling operation in time, which makes erroneous data transmission inevitable.

Such erroneous data transmission resulting from erroneous setting of a transmission destination cannot be prevented even by the server apparatus described in Japanese Laid-Open Patent Publication No. 2004-241953. In a reconfirmation process executed on the assumption that the subject of reconfirmation is a time-designated job, as described in Japanese Laid-Open Patent Publication No. 2004-241953, the confirmation process is possible because the job is to be executed at a designated time. The reconfirmation process, therefore, is not effective for image data transmission that gives little spare time between the start of original reading and the start of transmission.

The facsimile communication method described in Japanese Laid-Open Patent Publication No. 1990-246471 is executed on the assumption that both transmission destinations have already been input. According to the facsimile communication method, comparing both transmission destinations prevents erroneous data transmission, but a transmission destination to be input later is not provided by using a transmission destination that has been input upon setting up transmission of the previous data. The facsimile communication method of Japanese Laid-Open Patent Publication No. 1990-246471, therefore, may be applied in such a way that the previous transmission destination is called up using the redial function to provide the transmission destination of data to be input later, but a user rarely notices an error in transmission in such application, as in a case of other facsimile apparatuses, so that erroneous data transmission cannot be prevented.

Another object of the present invention is to provide an image data transmission apparatus and a program installed therein that can prevent erroneous transmission of image data even if little spare time is given between the start of original reading and the start of transmission upon setting a transmission destination using the previous data transmission destination to transmit image data.

An eleventh technical means is an image data transmission apparatus comprising: an image reading portion reading an image from an original to generate image data; a storing portion having stored thereon the read image data; a transmission destination setting portion setting a transmission destination of the stored image data; an image transmitting portion transmitting the stored image data to the set transmission destination via a network; a transmission destination determining portion determining presence or absence of a possibility that the transmission destination set at the transmission destination setting portion is an erroneously set transmission destination; a confirming portion that, after start of image reading by the image reading portion, requires a user to make a confirmation of correct setting of the transmission destination only when a result of the determination by the transmission destination determining portion indicates the presence of possibility of erroneous setting; and a transmission control portion controlling the image transmitting portion after the confirmation at the confirming portion to cause the image transmitting portion to transmit the image data stored on the storing portion to the transmission destination.

A twelfth technical means is the image data transmission apparatus of the eleventh technical means, wherein the transmission control portion causes the image transmitting portion to transmit the image data stored on the storing portion to the transmission destination only when the confirmation at the confirming portion is obtained at a point of completion of image reading by the image reading portion.

A thirteenth technical means is the image data transmission apparatus of the eleventh technical means, wherein the transmission control portion waits for the confirmation at the confirming portion even after completion of image reading by the image reading portion, and then causes the image transmitting portion to transmit the image data stored on the storing portion to the transmission destination.

A fourteenth technical means is the image data transmission apparatus of the eleventh technical means, wherein the transmission destination determining portion determines that a possibility of erroneous setting is present when a plurality of transmission destinations are set at the transmission destination setting portion.

A fifteenth technical means is the image data transmission apparatus of the fourteenth technical means, wherein the transmission destination setting portion has a specifying portion that sets a transmission destination through specification by a user, and an apparatus side specifying portion that sets a transmission destination through specification by the image data transmission apparatus side without depending on specification at the specifying portion, and wherein the transmission destination determining portion determines that a possibility of erroneous setting is present when a new transmission destination is set at the specifying portion in addition to a transmission destination set at the apparatus side specifying portion.

A sixteenth technical means is the image data transmission apparatus of the fifteenth technical means, wherein the apparatus side specifying portion has a stand-by portion that holds a transmission destination of data already transmitted before and that stands by in a state of being capable of subsequently transmitting different data to the same transmission destination, and specifies the same transmission destination as the stand-by portion stands by.

A seventeenth technical means is the image data transmission apparatus of the sixteenth technical means, wherein the stand-by portion permits or forbids the holding of the transmission destination based on contents of transmission of data based on the transmission destination to hold.

An eighteenth technical means is the image data transmission apparatus of the fourteenth technical means, being capable of data transmission through a plurality of transmission paths for data transmission forms different from each other, wherein the transmission destination determining portion determines that a possibility of erroneous setting is present when at least one of a plurality of transmission destinations set at the transmission destination setting portion is a transmission destination carrying out data transmission through a transmission path different from transmission paths of other transmission destinations.

A nineteenth technical means is the image data transmission apparatus of the fourteenth technical means, wherein the transmission destination determining portion determines that a possibility of erroneous setting is present when at least one of a plurality of transmission destinations set at the transmission destination setting portion is a transmission destination of data transmission to a transmission area different from other transmission areas.

A twentieth technical means is a program to be installed in the image data transmission apparatus of the eleventh technical means, the program operable to drive an internal computer of the image data transmission apparatus to function as the transmission destination determining portion, the confirming portion, and the transmission control portion.

BRIEF DESCRIPTION OF THE DRAWINGS

FIGS. 2A and 2B are pattern diagrams for explaining a data transmission process in pages and a data transmission process in files;

FIG. 4 depicts an example of an operation screen accompanying the data transmission process of FIG. 3;

FIG. 5 depicts an example of an operation screen following the operation screen of FIG. 4;

FIG. 6 depicts an example of an operation screen following the operation screen of FIG. 5;

FIG. 10 depicts an example of an operation screen accompanying the image data transmission process of FIG. 9;

FIG. 11 depicts an example of an operation screen following the operation screen of FIG. 10; and FIG. 12 depicts an example of an operation screen following the operation screen of FIG. 11.

PREFERRED EMBODIMENTS OF THE INVENTION

First Embodiment

A data transmission apparatus according to one embodiment of the present invention specifies (designates) transmission destination information through selective input from a pre-registered address note or direct input by a user, and transmits data to a transmission destination indicated by the specified transmission destination information via a network. Data to transmit includes not only image data obtained by optical original reading, etc., but also other type of data, such as text data.

Such a data transmission apparatus is provided as various types of apparatuses, which include, for example, a facsimile apparatus, a multifunction peripheral having a facsimile function, a PC or multifunction peripheral having an e-mail transmission function, and a PC or multifunction peripheral having a file transfer function. A network for a facsimile apparatus corresponds to an audio line, ISDN line, etc., and a network for an apparatus carrying out Internet facsimile transmission, regular e-mail transmission, file transfer, etc., corresponds to the Internet, Intranet, LAN, etc.

Figure 1:
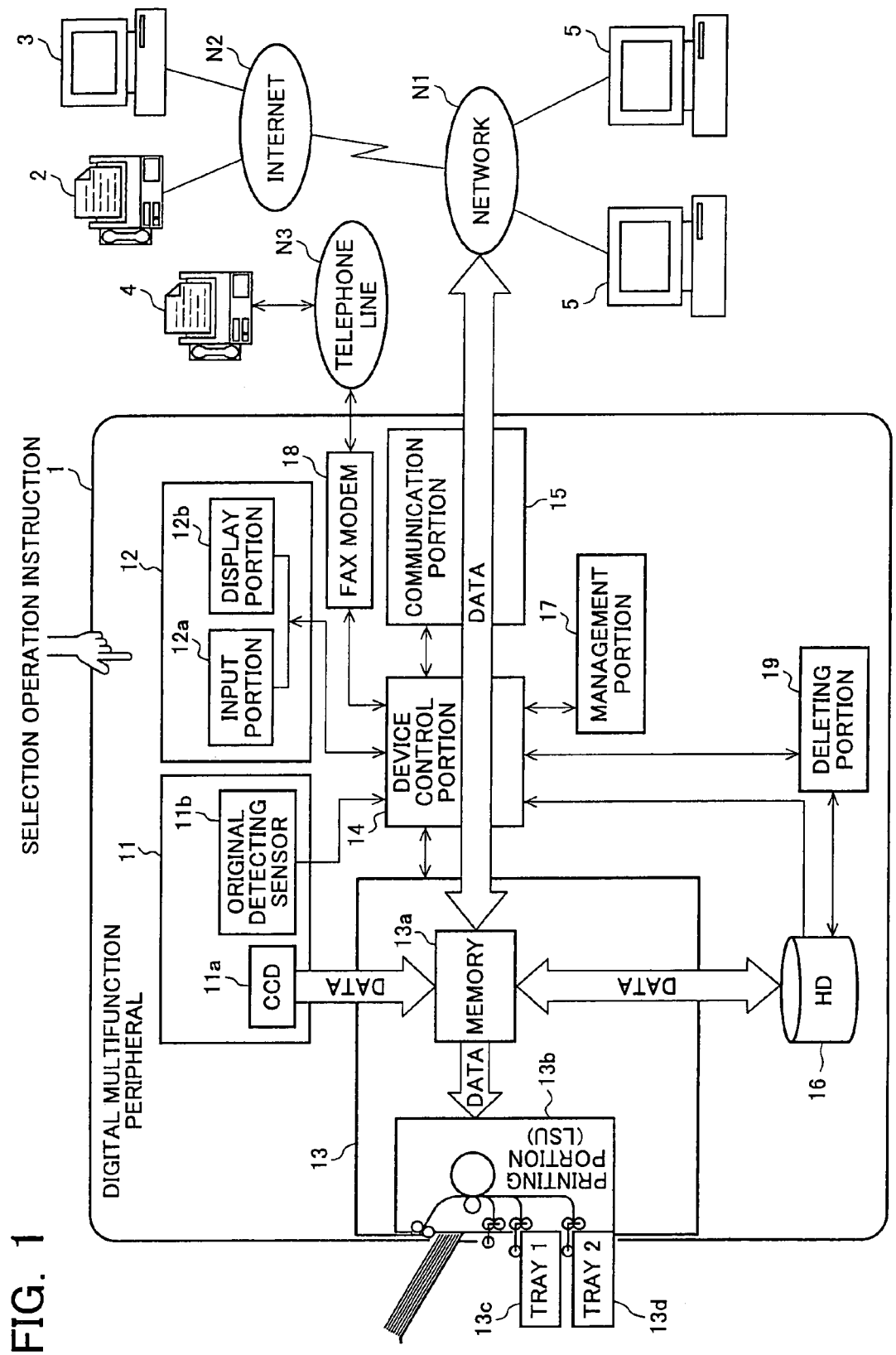
FIG. 1 is a block diagram for explaining a configuration of a digital multifunction peripheral to which the present invention applies.

FIG. 1 is a block diagram for explaining a configuration of a digital multifunction peripheral to which the present invention applies. In FIG. 1, 1 denotes the digital multifunction peripheral. The digital multifunction peripheral 1 will now be described as an example of the data transmission apparatus of the present embodiment, and the description applies also to other apparatuses. The digital multifunction peripheral 1 described here is an example of an image forming apparatus, and has a facsimile function, an Internet facsimile function, an e-mail transmission function, and a file transfer function, in addition to a copy function and a print function.

The digital multifunction peripheral 1 includes a device control portion 14 composed of a CPU carrying out calculation, a RAM having stored thereon temporary information accompanying calculation, etc. The device control portion 14 includes a ROM having stored thereon control programs (including a control program of the present embodiment to be described later) for controlling the digital multifunction peripheral 1.

A management portion 17 is connected to the device control portion 14, which management portion 17 is a memory having stored thereon management information (various control information including an address note) for managing processes executed by the digital multifunction peripheral 1. An image reading portion 11 is also connected to the device control portion 14, which image reading portion 11 reads an image recorded on a recording paper to generate image data. The image reading portion 11 has a CCD (Charged-Coupled Device) 11a that takes in an image of an original placed on an original glass plate or sent from an ADF (Automatic Document Feeder) as image data, and an original detecting sensor 11b that detects the presence/absence of an original.

An image forming portion 13 is also connected to the device control portion 14, which image forming portion 13 forms image data on a recording paper. The image forming portion 13 has a memory 13a having image data temporarily stored thereon, a print portion (LSU) 13b that forms an image out of image data stored on the memory 13a to record the image on a recording paper, and paper feeding trays 13c and 13d for image formation at the print portion 13b. The digital multifunction peripheral 1 causes the memory 13a to temporarily store thereon image data generated by the image reading portion 11 and then causes the print portion 13b to form an image. In this manner, the digital multifunction peripheral 1 functions as a copier.

A fax modem 18 carrying out facsimile communication is also connected to the device control portion 14 shown in FIG. 1, and the fax modem 18 is connected to a telephone line (public telephone line/audio line) N3. The digital multifunction peripheral 1 transmits image data generated by the image reading portion 11 to an external facsimile apparatus 4 by facsimile communication via the telephone line N3 connected to the fax modem 18. The digital multifunction peripheral 1 also causes the fax modem 18 to receive image data transmitted from the external facsimile apparatus 4 via the telephone line N3 and causes the image forming portion 13 to form an image out of the received image data. In this manner, the digital multifunction peripheral 1 functions as a facsimile apparatus.

A communication portion (transmission/reception portion) 15 is also connected to the device control portion 14, which communication portion 15 allows the digital multifunction peripheral 1 to transmit/receive information to/from an external device. The communication portion 15 can be connected to a communication network N1, such as in-house LAN, to which one or a plurality of PCs 5 can be connected. In an ordinary state where the digital multifunction peripheral 1 operates independently, the communication portion 15 is connected to the communication network N1 to exchange information with the PCs 5 via the communication network N1.

The digital multifunction peripheral 1 transmits image data generated by the image reading portion 11 from the communication portion 15 to the PCs 5. In this manner, the digital multifunction peripheral 1 functions as a scanner apparatus (file transfer apparatus) with a file transmission function.

A hard disc drive (HD) 16 is connected to the device control portion 14. The HD 16 has stored thereon image data related to image processing, such as image data generated by the image reading portion 11. The digital multifunction peripheral 1 functions also as a file transfer apparatus handling data other than image data obtained by original reading. For example, the digital multifunction peripheral 1 transmits data stored on the HD 16 to the PCs 5 or to an external PC 3, which will be described later, via the communication portion 15. A deleting portion 19 is also connected to the device control portion 14. The deleting portion 19 follows control by the device control portion 14 to delete data recorded and held recorded in the HD 16.

The digital multifunction peripheral 1 causes the communication portion 15 to receive image data transmitted from the PCs 5 and causes the image forming portion 13 to form an image out of the received image data. In this manner, the digital multifunction peripheral 1 functions as a print apparatus (printer).

The communication network N1 is connected also to a wide-area communication network N2, such as the Internet. The communication portion 15 is capable of receiving image data from an Internet facsimile apparatus 2 and the external PC3, which are connected to the wide-area communication network N2, via the communication network N1 and the wide-area communication network N2 through such a method as attachment of image data to an e-mail to transmit. In this manner, the digital multifunction peripheral 1 functions as an Internet facsimile apparatus or an e-mail transmission apparatus.

An operation portion 12 is also connected to the device control portion 14, which operation portion 12 receives operations including a user's specifying a transmission destination. The operation portion 12 is composed of an input portion 12a provided as a touch panel, a ten-key board, etc., to which such information as a control command is input through operation by the user, and a display portion 12b provided as a liquid crystal panel, etc., that displays information necessary for operation. The operation portion 12 should preferably be configured so that the text of an e-mail can be input together with the e-mail to the operation portion 12 when the e-mail is generated. An authentication code for authenticating the administrator or user (i.e., operator) of the digital multifunction peripheral 1 is input to the operation portion 12. The authentication code may be input from an external device via the communication portion 15, etc.

The following is the description of main features of the present embodiment that are incorporated in the digital multifunction peripheral 1 having the configuration as described above. FIGS. 2A and 2B are pattern diagrams for explaining a data transmission process in pages and a data transmission process in files.

The digital multifunction peripheral 1 includes a holding portion that holds transmission destination information specified at the time of data transmission described above, and a control portion that controls the holding portion to cause the holding portion to keep holding the transmission destination information and stand by in a state of being capable of subsequently transmitting different data to the same transmission destination even after completion of the above data transmission based on the transmission destination information. In the digital multifunction peripheral 1, the holding portion can be composed of memories in the management portion 7 and device control portion 14, and the control portion can be incorporated in an executable manner as one of control programs in the device control portion 14.

In this embodiment, as described above, the digital multifunction peripheral 1 causes the holding portion to keep holding specified transmission destination information and stand by in a state of having set the transmission destination information as a transmission destination even after completion of data transmission based on the transmission destination information, thereby enables subsequent transmission of different data to the set transmission destination.

Such a process is convenient in transmitting different data in succession to a once specified transmission destination, but maintaining transmission destination information may bring inconvenience in some cases. Separate scenes will be considered as a case where maintaining a transmission destination is desirable and as a case where maintaining a transmission destination is undesirable.

<Scene 1>

In fax transmission using a conventional facsimile apparatus, when a user specifies (sets) a transmission destination, sets an original, and presses a start key, an original image obtained by reading the transmission original is transmitted in pages (sequentially from 1 to N pages), as shown in FIG. 2A. When a different transmission original to be transmitted to the same transmission destination is present, it is desirable for saving communication costs and simplifying transmission instruction setting that the different transmission original be set in addition while the same transmission destination be maintained in succession to the preceding transmission original to transmit the set transmission original. In this scene, however, reading the original to transmit first and the original to transmit next all at once will suffice for the object to achieve by holding the transmission destination. Considering this point, this scene arises not so often. Maintaining the same transmission destination to allow data transmission thereto, therefore, may lead to erroneous data transmission.

<Scene 2>

When a different original is to be transmitted to a different transmission destination after an original has been transmitted in pages to a certain transmission destination in the same manner as the scene 1, maintaining the same transmission destination is unnecessary and invites erroneous data transmission when the user does not notice the maintained transmission destination.

<Scene 3>

In data transmission using an Internet facsimile apparatus or a scanner transmission apparatus in these days, when a user specifies (sets) a transmission destination, sets an original, and presses a start key, an original image obtained by reading the transmission original is transmitted in files (as a piece of data of N originals), as shown in FIG. 2B. Data transmitted in files is processed as a PDF file, but may be processed as another type of file. When a different transmission original to be transmitted to the same transmission destination is present, it is desirable for simplifying the transmission process that the same transmission destination be maintained at the point of completion of transmission of the preceding transmission original to transmit the next transmission original. When all originals are read at once and are transmitted in files to the same transmission destination, the reception side, such as a PC, may use the received data files in a different format, in which case transmitting a plurality of document files separately for each document file is advantageous.

<Scene 4>

When a file is to be transmitted to a different transmission destination after data has been transmitted in files to a certain transmission destination in the same manner as the scene 3, maintaining the same transmission destination is unnecessary and invites erroneous data transmission when the user does not notice the maintained transmission destination.

In view of the scenes 1 to 4, a scene where transmission destination information is used continuously following preceding data transmission corresponds only to the scene 3, where a data format in transmission is a file format and data is transmitted to be handled as image data, etc., received in files. The scene 3 includes a case (1) where image data or data file is transmitted via a network, a case (2) where a transmission original is transmitted in the form of one file by Internet fax, and a case (3) where data is transmitted in files via a network. Transmission destination information used in the scene 3 includes an IP address and e-mail address. In the scene 4, transmission is carried out in the same data format as in the scene 3, and a difference between the scene 3 and the scene 4 will be described later.

A scene where data is transmitted to a new transmission destination without using transmission destination information continuously following preceding data transmission corresponds to the scenes 1 and 2, where a data format in transmission is not a file format but data is transmitted to be handled as image data, etc., received in pages. The scenes 1 and 2 include a case where image data is transmitted over a telephone line, and transmission destination information used in the scenes 1 and 2 is a fax number. Transmission destination information is not used continuously in the scene 4 same as in the scenes 1 and 2, and a difference between the scenes 1 and 2 and the scene 4 will be described later.

Thus, in implementation of a main feature of the present embodiment, the above control portion, following transmission of data to a transmission destination indicated by specified transmission destination information via a network, carries out control to permit or forbid (restrict) holding of the transmission destination information by the holding portion based on the contents of data transmission based on the transmission destination information. In other words, in the present embodiment, whether or not to keep holding a transmission destination even after completion of data transmission is determined depending on the contents of data transmission to the transmission destination (transmission destination information, etc.). While the digital multifunction peripheral 1 is presented here as an example of the data transmission apparatus of the present embodiment, the data transmission apparatus is configured as any apparatus that includes the above holding portion and control portion.

Figure 3:
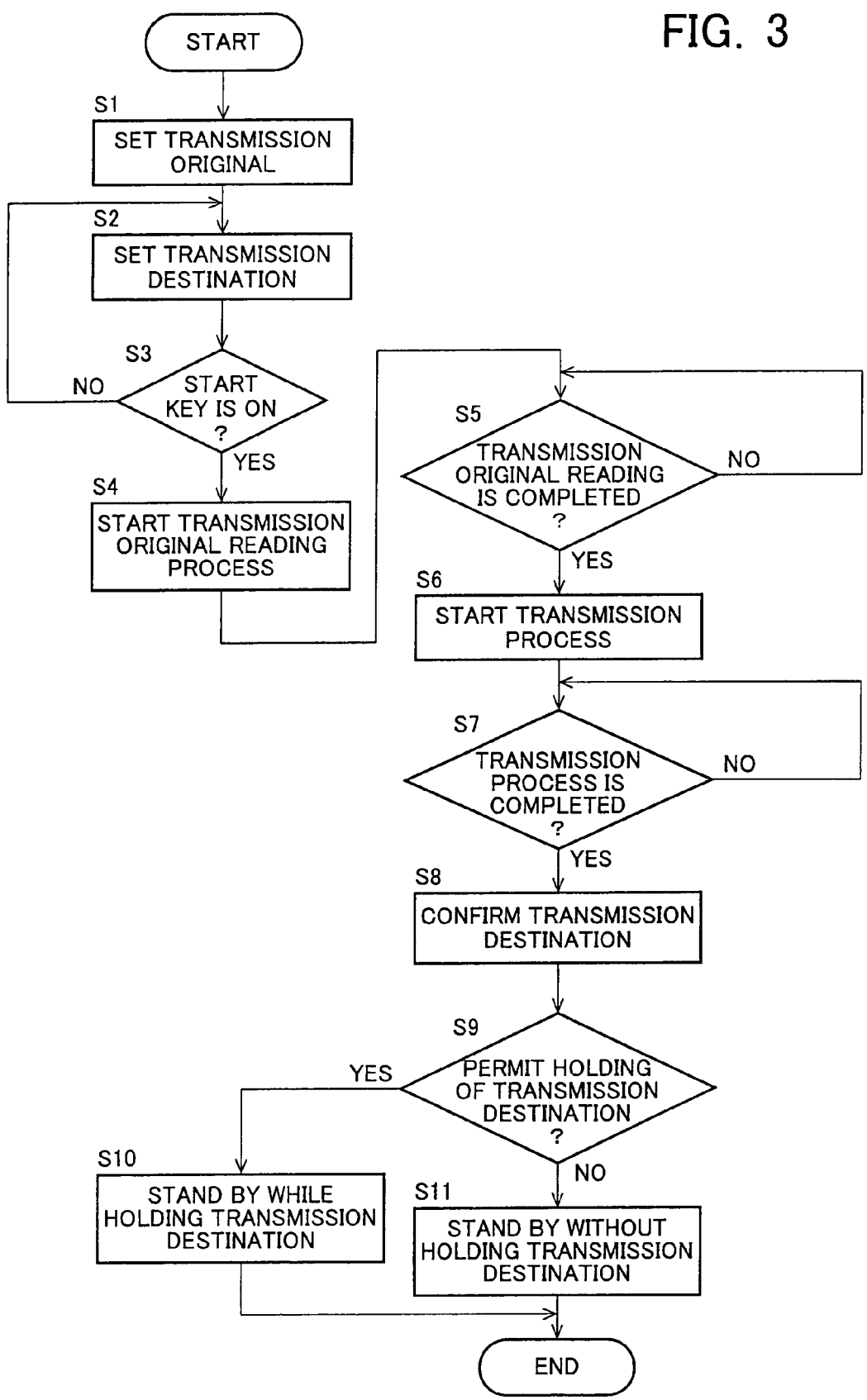
FIG. 3 is a flowchart for explaining an example of a data transmission process executed by the digital multifunction peripheral of FIG. 1.

FIG. 3 is a flowchart for explaining an example of a data transmission process executed by the digital multifunction peripheral of FIG. 1. FIGS. 4 to 8 depict an example of a series of operation screens (operation screens on the touch panel) accompanying the data transmission process of FIG. 3.

When the original detecting sensor 11b detects setting of an original on the original glass plate or on the ADF (step S1), the input portion 12a receives transmission destination setting input (designation) from a user (step S2). The order of steps S1 and S2 is irrelevant here. At step S2, setting input is not limited to direct input, but an address note registered with and managed by the management portion 17, etc., may be called up to allow the user to select a transmission destination.

The process of the present embodiment will be described through a case where the address note is called up to allow the user to select a transmission destination. In a process at step S2, the device control portion 14 causes the display portion 12b to display an initial screen for data transmission shown as an operation screen 21 of FIG. 4. On the operation screen 21, the user presses a local address note button 22, and when information of the user's pressing the button 22 is communicated to the device control portion 14, the management portion 17 calls up the address note to display a list of each transmission destination, as shown on an operation screen 23 of FIG. 5. On the operation screen 23, the names of and transmission methods for the transmission destinations are displayed together with a sentence 24 expressing readiness for transmission, the names and transmission methods being displayed as "A company Internet fax" 25a, "B company fax" 25b, "C company Internet fax" 25c, "E company PC" 25d, "A company fax" 25e, etc. The user is to select a transmission destination from this list of transmission destinations.

For example, when the user selects "A company Internet fax" 25a, "A company Internet fax" 25a is highlighted to put its address "aaaa@aaa.co.jp" 27 in display and a sentence 28 indicating "aaaa@aaa.co.jp" 27 is the address of the next transmission comes up, as shown in the operation screen of FIG. 6.

Figure 7:
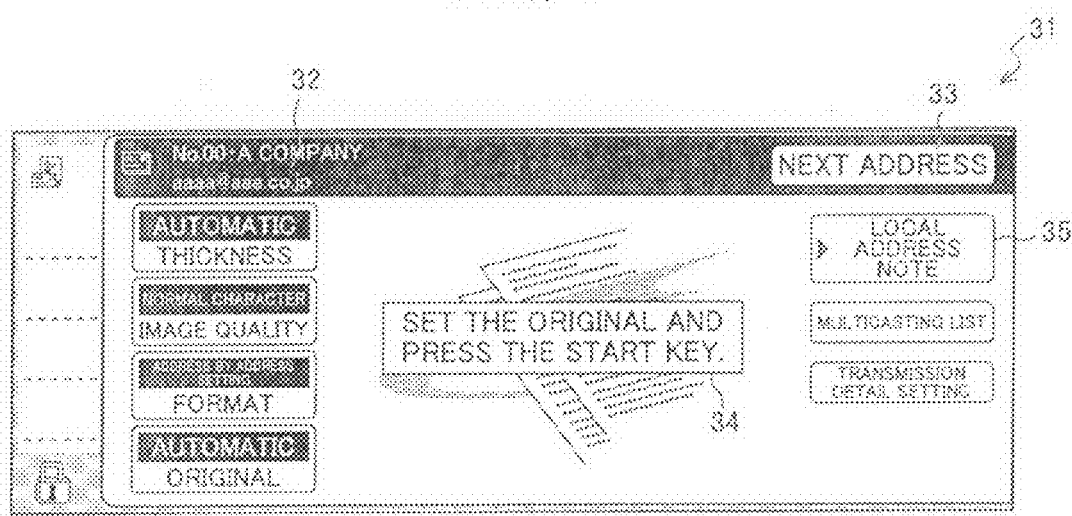
FIG. 7 depicts an example of an operation screen following the operation screen of FIG. 6.

When an original is not set, the display portion 12b displays an indication 34 "Set the original and press the start key", which prompts original setting and pressing of the start key, as shown on a setting screen 31 of FIG. 7. When the original is set at step S1, the indication prompts pressing of the start key only, in which case the address of the current transmission "aaaa@aaa.co.jp" 32 (27) is kept displayed, and a sentence 33 (28) indicating "aaaa@aaa.co.jp" (32) 27 is the address of the next transmission remains as it is.

Selection of a local address note button 35 by the user allows addition of a transmission destination. For example, when the setting screen of FIG. 6 is displayed again and "C company Internet fax" 25c is selected, an additional address is displayed in such a final form of "aaaa@aaa.co.jp; cccc@ccc.co.jp" in replacement of "aaaa@aaa.co.jp" 27 on the setting screen of FIG. 7, where the indication 34 prompting (original setting and) pressing of the start key is also displayed.

In this state, the device control portion 14 determines on whether the start key has been pressed (turned on) at the input portion 12a (step S3), and, when the key has been pressed, instructs the CCD 11a to start reading an original to transmit (step S4). Subsequently, the device control portion 14 determines on whether original reading is completed (step S5), and starts a transmission process on read image data at the point of completion of reading (step S6). At step S6, when a transmission form of Internet fax is selected, Internet facsimile transmission is carried out, and when a transmission destination adopting another transmission form is selected, transmission corresponding to the adopted transmission form is carried out. Then, the device control portion 14 determines on whether the transmission process is completed (step S7).

While a series of processes executed at steps S1 to S7 are described through an example of a process of optically reading an original to transmit read data, a process of transmitting data stored in advance on the HD 16 and of generating an e-mail through input from the input portion 12a to transmit the e-mail may also be executed in the same manner when steps S1, S4, and S5 are replaced with the steps corresponding to the above processes to execute.

When the transmission process is completed at step S7, the device control portion 14 accesses the management portion 17 to confirm a transmission destination (step S8). At step S8, the contents of transmission of the previous (first) data is confirmed based on transmission destination information of the previous (first) transmission (in the above example, "A company Internet fax" 25a or the address "aaaa@aaa.co.jp" equivalent thereto).

Subsequently, based on a confirmation result, the device control portion 14 makes a determination on whether to permit or forbid (restrict) holding of the transmission destination information held in memories, etc., in the management portion 17 and the device control portion 14 (step S9), and carries out control in accordance with the determination (steps S10 and S11). The determination at step S9 may be executed following completion of transmission of the previous data, as described here, but may be executed before transmission of the previous data.

Figure 8:
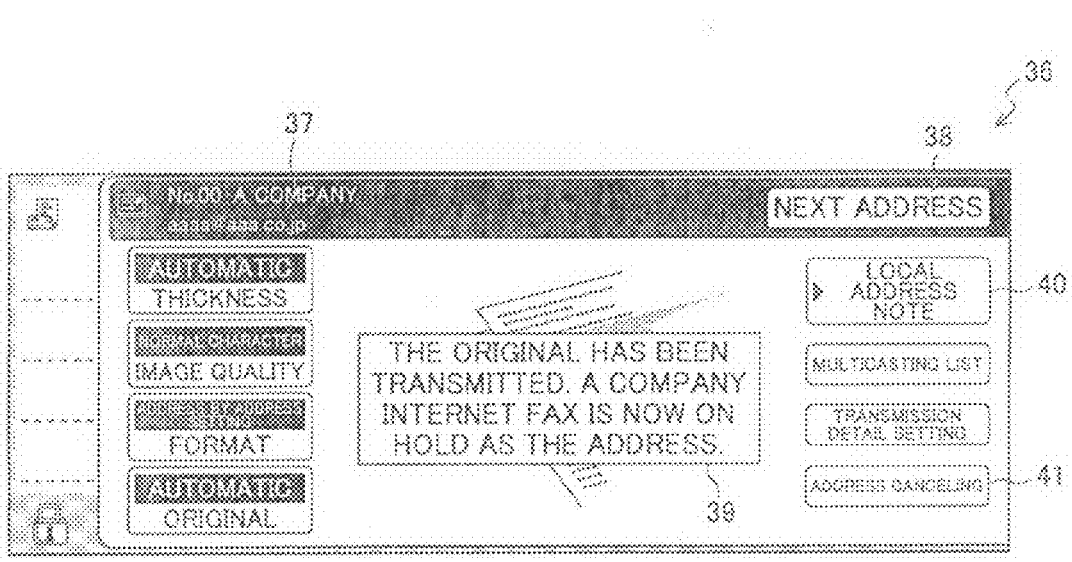
FIG. 8 depicts an example of an operation screen following the operation screen of FIG. 7.

When the transmission destination information is to be held continuously, the device control portion 14 keeps displaying the first transmission address "aaaa@aaa.co.jp" 37 and the sentence 38 indicating "aaaa@aaa.co.jp" 37 is the next address on the display portion 12b, as shown in the setting screen 36 of FIG. 8, and waits for reception of the next data (step S10). Display of the above address 37 and sentence 38 is an instance of a notice process of noticing a user, who tries to transmit different data, that the holding portion is holding the transmission destination information. Instead of a notice portion carrying out this notice process, a notice portion giving a notice by sounding voice guidance may be provided. In addition, a sentence 39 "Original has been transmitted. A company Internet fax is now on hold as the address." is also displayed, as shown in the setting screen 36 of FIG. 8. This sentence 39 is also one of notices given by the notice portion.

In this example, "A company Internet fax" 25a is the first transmission destination, which case corresponds to the scene 3, so that the process at step S10 is carried out. Through holding of the transmission destination as described above, the user is allowed to transmit data only by selecting or inputting (reading, etc.) the data to transmit without a need of calling to a transmission destination.

On the other hand, when "A company fax" 25e is selected as the first transmission destination, for example, holding of the transmission destination is forbidden. In this case, the device control portion 14 does not hold the transmission destination, but waits for input of the next data and transmission destination (step S11). For example, such a screen holding no address as the setting screen 23 of FIG. 5 is displayed on the display portion 12b. This prevents such erroneous data transmission of transmitting different (next) data by fax to the same transmission destination, which may happen in the scenes 1 and 2.

Thus, according to the present embodiment, trouble of specifying or inputting a transmission destination can be saved upon transmitting different data to the same transmission destination as the previous transmission destination while erroneous data transmission is prevented.

The determination at step S9 (determination on the above scenes) may be made based on a data format by adopting data format as an element representing the contents of data transmission. In other words, the control program of the device control portion 14 may make a determination based on a data format, as described in connection with the scenes 1 to 4. Data format mentioned here is applicable if it is a data format that allows a determination on whether given data is facsimile data adopted for the digital multifunction peripheral 1 or data of another format adopted likewise.

The determination at step S9 may be made based on another criterion, that is, based on whether the previous (first) transmission data is data in pages or data in files. Specifically, the control program of the device control portion 14 may make a determination based on whether the first transmission data is data in pages or data in files, as described in connection with the scenes 1 to 4. A difference between data in pages and data in files may be used for determination as an element of a difference in data format as described above.

Particularly, when data to transmit is data in pages, a determination forbidding holding of the previous transmission destination information is made. Specifically, the control program carries out control to forbid holding of transmission destination information on the condition that data to transmit or transmitted data is data in pages. Besides an apparatus capable of data transmission both in pages and in files, which apparatus is exemplified by the digital multifunction peripheral 1, a data transmission apparatus capable of data transmission only in pages or in files also executes the above determination procedure, thus capable of executing such holding forbidding process.

For the determination at step S9, still another criterion may be adopted as the contents of data transmission. This criterion is a transmission path for the first data to transmit, and the control program carries out control to forbid holding of transmission destination information based on the transmission path for the first data to transmit.

For example, the control program carries out control to forbid the holding when the telephone line N3 is the transmission path (when the fax modem 18 is used) and permit the holding when the communication network N1 (and the Internet N2 via the communication network N1) is the transmission path. The former of the above two kinds of transmission paths is equivalent to a transmission path for transmitting data in pages, and the latter is a transmission path for transmitting data of a plurality of pages in the form of one file (transmitting data as one file). In other words, therefore, the control program carries out control to forbid holding of transmission destination information on the condition that the transmission path for transmitting data in pages is used. More specifically, the control program may carry out control in such a way that the control program forbids the holding when the fax modem 18 is turned on while permits the holding otherwise. This criterion can be used when data transmission is executable through a plurality of transmission paths for data transmission forms different from each other, as in the case of the digital multifunction peripheral 1.

The determination at step S9 may also be made based on still another criterion adopted as the contents of data transmission, which criterion is what transmission destination information is made of. In this case, the control program of the device control portion 14 carries out control to forbid holding of transmission destination information based on the transmission destination information for data transmission.

In confirming transmission destination information adopted as the criterion, the type of a transmission destination (fax address, address of another communication medium, or external fax address, etc.), a number, or an address itself may be confirmed. As described in connection with the scenes 1 to 4, the control may be carried out in such a simple way that transmission destination information is not held when it is a fax number and is held when it is an e-mail address or an IP address. Besides, the type of a transmission destination can be regarded as a transmission area indicated by transmission destination information. This allows such application in the control that the domain of an address or several front digits of a fax number is confirmed to permit holding of transmission destination information after sending data to the office but forbid holding of the transmission destination information after sending the data to a destination outside the office.

In various cases at step S9 as described above, a transmission destination remains held not only in a case corresponding to the scene 3 but also in a case corresponding to the scene 4. In the scene 4, therefore, the control program should preferably carry out control to allow canceling of holding of a transmission destination after the transmission destination is held.

To that end, when the process at step S10 (process for holding) is executed, the device control portion 14 displays the sentence 39 "Original has been transmitted. A company Internet fax is now on hold as the address." together with an address cancel button 41 for canceling the address, as shown on the setting screen 36 of FIG. 8. The user is able to return to the setting screen 23 of FIG. 5 by pressing the address cancel button 41.

Display of the above sentence 39 and address cancel button 41 is executed as an instance of a use confirmation process of requiring the user to confirm whether or not to use a transmission destination indicated by held transmission destination information also for different data when the holding portion is holding the transmission destination information. Thus, a use confirming portion that executes such a use confirmation process is incorporated in the digital multifunction peripheral 1. Addition of a new transmission destination is, therefore, accepted only when the use confirming portion obtains a confirmation that the transmission destination is used. In a case of the setting screen 36 of FIG. 8, the local address note button 40 is displayed on the screen for allowing selection of the address note. When the address cancel button 41 is not pressed but the local address note button 40 is pressed, the device control portion 14 concludes that the confirmation is obtained, thus allows setting of a different transmission destination in addition to the held transmission destination.

While the description centering on the data transmission apparatus of the present embodiment has been made with reference to FIGS. 1 to 8, the present embodiment may be provided also in the form of a program, which is exemplified by the control program in the device control portion 14. This program is installed in the control portion (such a storing portion as ROM in the control portion) of the data transmission apparatus to cause the control portion (processing unit of the control portion) to execute the above procedure of the present embodiment. In other words, this program causes the control portion of the data transmission apparatus to function as "the control portion that controls the holding portion to cause the holding portion to keep holding transmission destination information and stand by in a state of being capable of subsequently transmitting different data to the same transmission destination even after completion of data transmission based on the transmission destination information." The control portion of the data transmission apparatus is the portion that is equivalent to an internal computer of the data transmission apparatus. The above program may be distributed through a computer-readable recording medium having the program recorded thereon or via a network.

A recording medium having memorized thereon a program or data for achieving functions of the present embodiment will be described briefly. The recording medium, specifically, is provided in the form of a CD-ROM, magnetic optical disk, DVD-ROM, FD, flash memory, various types of ROMs and RAMs, etc. The above program is recorded on such a recording medium and is distributed to facilitate the achievement of the functions. For example, the above recording medium is mounted on a general-purpose computer, and the program is read out from the recording medium and is transferred to the device control portion 14, etc., of the digital multifunction peripheral 1 of FIG. 1 to put the program in storage on the device control portion 14, then the program is read out when necessary to achieve the functions of the present embodiment. When the program is executed on the general-purpose computer, the recording medium is mounted on the computer to read out the program on the computer, as described above, or the program is stored on a ROM, etc., of the computer and is read out when necessary to achieve the functions of the present embodiment.

Thus, according to the present embodiment, trouble of specifying or inputting a transmission destination can be saved upon transmitting different data to the same transmission destination as the previous transmission destination while erroneous data transmission is prevented.

Second Embodiment

An apparatus according to another embodiment of the present invention is provided by limiting the subject of transmission to image data read by the image reading portion in the above data transmission apparatus. Specifically, an image data transmission apparatus of the present embodiment sets (specifies) a transmission destination through selective input from the pre-registered address note or direct input by a user or through automatic specification by the apparatus, and transmits image data generated by optically reading an original to the specified transmission destination indicated by transmission destination information via a network.

Such an image data transmission apparatus is provided as various types of apparatuses, which include, for example, a facsimile apparatus, a multifunction peripheral having a facsimile function, a PC or multifunction peripheral having an e-mail transmission function, and a PC or multifunction peripheral having a file transfer function. A network for a facsimile apparatus corresponds to an audio line, ISDN line, etc., and a network for an apparatus carrying out Internet facsimile transmission, regular e-mail transmission, file transfer, etc., corresponds to the Internet, Intranet, LAN, etc.

The digital multifunction peripheral 1 of FIG. 1 will now be described as an example of the image data transmission apparatus of the present embodiment, and the description applies also to other apparatuses. The configuration of the digital multifunction peripheral 1 is the same as described above, except that the management portion 17 has stored thereon various control information including the address note and determination criteria of the present embodiment, which will be described later, as management information for managing processes executed by the digital multifunction peripheral 1, and that the ROM of the device control portion 14 has stored thereon a control program of the present embodiment, which will be described later as a control program.

Main features of the present embodiment incorporated into the digital multifunction peripheral 1 having the above configuration will be described. The digital multifunction peripheral 1 includes an image reading portion that reads an image from an original to transmit to generate image data, as exemplified by the image reading portion 11, and a storing portion that has stored thereon read image data, as exemplified by the memory 13$a$ (or HD 16). The digital multifunction peripheral 1 further includes a transmission destination setting portion that sets (specifies or designates) a transmission destination of stored image data, as exemplified by the operation portion 12. The digital multifunction peripheral 1 also includes an image transmitting portion that transmits stored image data to a set transmission destination via network, as exemplified by the fax modem 18, the communication portion 15, and the device control portion 14 (and management portion 17) controlling the fax modem 18 and communication portion 15.

The above transmission destination setting portion, as it will be described later, should preferably have not only a specifying portion that sets a transmission destination through specification by a user but also have an automatic setting portion that sets a transmission destination through automatic specification of the transmission destination by the digital multifunction peripheral 1 itself. This automatic setting portion sets a transmission destination in accordance with specification by the digital multifunction peripheral 1 without depending on specification at the specifying portion and regardless of the user's will at the time of transmission of image data. The automatic setting portion, therefore, can be referred to as an apparatus side specifying portion, and specification at the apparatus side is not limited to automatic specification carried out before the user's specification at the specifying portion but may include automatic specification carried out after the user's specification at the specifying portion.

A preferred example of the above automatic setting portion that should preferably be incorporated into the present embodiment will be described. In addition to a case described below, the automatic setting portion operates in various cases including a case where the automatic setting portion adds and automatically sets a given transmission destination or a transmission destination related to a data sender (user) for every data transmission.

The automatic setting portion illustrated here has a stand-by portion that holds a transmission destination of data (not limited to image data) already transmitted before (preferably, just before) and that stands by in a state of being capable of subsequently transmitting different data to the same transmission destination. The automatic setting portion specifies the same transmission destination as the stand-by portion stands by. In the digital multifunction peripheral 1, a holding area of the stand-by portion is composed of memories in the management portion 17 and the device control portion 14, and a stand-by control process itself can be incorporated in an executable manner as one of control programs in the device control portion 14.

In this manner, the stand-by portion keeps holding information of a specified transmission destination and stands by in a state of having set the transmission destination information as a transmission destination even after completion of data transmission based on the specified transmission destination, thereby enables subsequent transmission of different data to the specified transmission destination.

Such a process is convenient in transmitting different data in succession to a once specified transmission destination, but maintaining transmission destination information may bring inconvenience in some cases. With reference to FIGS. 2A and 2B, separate scenes will be considered as a case where maintaining a transmission destination is desirable and as a case where maintaining a transmission destination is undesirable. The following scenes 1a to 4a in the present embodiment correspond to the scenes 1 to 4 in the first embodiment.

<Scene 1a>

In fax transmission using a conventional facsimile apparatus, when a user specifies (sets) a transmission destination, sets an original, and presses a start key, an original image obtained by reading the transmission original is transmitted in pages (sequentially from 1 to N pages), as shown in FIG. 2A. When a different transmission original to be transmitted to the same transmission destination is present, it is desirable for saving communication costs and simplifying transmission instruction setting (to eliminate a need of a call operation (specifying operation) of calling to the previous transmission destination using a redial function) that the different transmission original be set in addition while the same transmission destination be maintained in succession to the preceding transmission original to transmit the set transmission original. However, the previous transmission destination on hold is so often different from the next transmission destination to follow not only when a user is replaced but also when the same user uses the facsimile apparatus. Adopting the above configuration, therefore, brings a high possibility that the user carries out erroneous data transmission without noticing the difference between both transmission destinations, consequently, the configuration is not realistic but is inconvenient. Besides, in this scene, reading the original to transmit first and the original to transmit next all at once will suffice for the object to achieve by holding of the transmission destination. Considering this point, this scene arises not so often. Maintaining the same transmission destination to allow data transmission thereto, therefore, may lead to erroneous data transmission.

<Scene 2a>

When a different original is to be transmitted to a different transmission destination after an original has been transmitted in pages to a certain transmission destination in the same manner as the scene 1a, maintaining the same transmission destination is unnecessary and invites erroneous data transmission when the user does not notice the maintained transmission destination.

<Scene 3a>

In data transmission using an Internet facsimile apparatus or a scanner transmission apparatus in these days, when a user specifies (sets) a transmission destination, sets an original, and presses a start key, an original image obtained by reading the transmission original is transmitted in files (as a piece of data of N originals), as shown in FIG. 2B. Data transmitted in files is processed as a PDF file, but may be processed as another type of file. When a different transmission original to be transmitted to the same transmission destination is present, it is desirable for simplifying the transmission process that the same transmission destination be maintained at the point of completion of transmission process of the preceding transmission original to transmit the next transmission original. When all originals are read at once and are transmitted in files to the same transmission destination, the reception side, such as a PC, may use the received data files in a different format, in which case performing a transmission process of a plurality of document files separately for each document file is advantageous because such a transmission process saves the reception side PC from trouble of dividing the received data in desirable data unit for management.

<Scene 4a>

When a file is to be transmitted to a different transmission destination after data has been transmitted in files to a certain transmission destination in the same manner as the scene 3a, maintaining the same transmission destination is unnecessary and invites erroneous data transmission when the user does not notice the maintained transmission destination.

In view of the scenes 1a to 4a, a scene where transmission destination information is used continuously following preceding data transmission corresponds only to the scene 3a, where a data format in transmission is a file format and data is transmitted to be handled as image data, etc., received in files. The scene 3a includes a case (1) where image data or data file is transmitted via a network, a case (2) where a transmission original is transmitted in the form of one file by Internet fax, and a case (3) where data is transmitted in files via a network. Transmission destination information used in the scene 3a includes an IP address and e-mail address. In the scene 4a, transmission is carried out in the same data format as in the scene 3a, and a difference between the scene 3a and the scene 4a is the same as the difference between the scene 3 and the scene 4 as described above.

A scene where data is transmitted to a new transmission destination without using transmission destination information continuously following preceding data transmission corresponds to the scenes 1a and 2a, where a data format in transmission is not a file format but data is transmitted to be handled as image data, etc., received in pages. The scenes 1a and 2a include a case where image data is transmitted over a telephone line, and transmission destination information used in the scenes 1a and 2a is a fax number. Transmission destination information is not used continuously in the scene 4a, as in the scenes 1a and 2a, and a difference between the scenes 1a and 2a and the scene 4a is the same as the difference between the scenes 1 and 2 and the scene 4 as described above.

Thus, the above stand-by portion holds a transmission destination not in every scene, but, following transmission of data to a specified transmission destination (i.e., transmission destination indicated by transmission destination information) via a network, should preferably permit or forbid holding of the transmission destination based on the contents of data transmission (transmission destination information, etc.) based on the transmission destination to be held. In other words, the preferred stand-by portion determines on whether or not to keep holding a transmission destination even after completion of data transmission, depending on the contents of data transmission to the transmission destination.

An automatic setting process by the automatic setting portion (particularly, a stand-by process by the stand-by portion) is exemplified by the processes at steps S1 to S11 that are described in the first embodiment referring to FIGS. 3 to 8. The description of the automatic setting process including application examples is the same as the description of the processes described in the first embodiment, and is, therefore, omitted. As described above, the scenes 1a to 4a in the present embodiment correspond to the scenes 1 to 4 in the first embodiment, respectively. Thus, the digital multifunctional peripheral 1 provided with the stand-by portion is capable of saving trouble of specifying or inputting a transmission destination upon transmitting different data to the same transmission destination as the previous transmission destination while preventing erroneous data transmission.

As a transmission process is carried out under circumstances as shown in FIGS. 3 to 8, it is not certain whether a new transmission destination set (added) this time in addition to an already set transmission destination is a transmission destination that is added under understanding of a user (under a scene where the transmission destination has been already set). When a plurality of transmission destinations are present, whether the user has specified the transmission destinations while paying attention to the contents of transmission destinations is not certain regardless of execution or no execution of the above stand-by process.

In the present embodiment, therefore, the digital multifunction peripheral 1 requires confirmation by the user in response to a scene. The digital multifunction peripheral 1 thus reads a transmission original while requiring the user's confirmation, and proceeds directly to the transmission process when the confirmation is obtained at the point of completion of transmission original reading, while starts the transmission process at the point of obtaining the confirmation when the confirmation is not obtained at the point of completion of original reading. In a case of ordinary facsimile transmission, particularly, sufficient time for requiring the confirmation is given at the time of image reading. In Internet facsimile transmission, post-scanning e-mail transmission, and file transmission, on the other hand, data is transmitted immediately, which raises the necessity of requiring the confirmation, in which case the present embodiment is advantageous.

For that reason, the digital multifunction peripheral 1 includes a transmission destination determining portion, a confirming portion, and a transmission control portion as a main feature of the present embodiment, which will be described later. In the digital multifunction peripheral 1, these portions have a storage area for information for determination that is composed of memories in the management portion 17 and the device control portion 14, and processes of determination, confirmation, and transmission control itself can be incorporated in an executable manner as one of control programs in the device control portion 14. While the image data transmission apparatus of the present embodiment is exemplified by the digital multifunction peripheral 1 here, the image data transmission apparatus may be configured as an apparatus that includes those transmission destination determining portion, confirming portion, and transmission control portion in addition to the above image reading portion, storing portion, transmission destination setting portion (preferably, stand-by portion is also included), and image transmitting portion.

The transmission destination determining portion determines the presence or absence of a possibility that a transmission destination set at the transmission destination setting portion is an erroneously set transmission destination. This determination is executed as the transmission destination determining portion accesses and searches the memory of the management portion 17, etc. The criterion of the determination will be described later referring to a variety of cases. A result of the determination is used at the confirming portion, which will be described later, so that the determination is made at least before execution of the confirmation.

The confirming portion, after the start of image reading (preferably, during image reading) by the image reading portion 11, requires the user to make a confirmation of correct setting of a transmission destination only when a determination result given by the transmission destination determining portion indicates a possibility of the presence of erroneous setting. A control process of causing the display portion 12b of the operation portion 12 to carry out confirmation display and a control process of receiving a confirmation result from the input portion 12a are incorporated as a program in the confirming portion in an executable manner.

Following confirmation of a transmission destination at the confirming portion (i.e., upon confirmation of correct setting of the transmission destination), the transmission control portion controls the image transmitting portion, causing it to transmit image data stored (kept stored) on the memory 13a, HD 16, etc., to the confirmed transmission destination. This transmission control portion is the portion that executes control following the confirmation. The transmission control portion, therefore, executes its control only when a possibility of erroneous setting is present. When a possibility of erroneous setting is absent, image data transmission is executed without the confirmation.

Thus, in the present embodiment, when a transmission destination of a transmission original is specified and the transmission start key is operated, for example, original reading is started depending on a status of specification of the transmission destination, and reconfirmation of the transmission destination by the user is required. When confirmation by the user is obtained, transmission of read original data is started. Read original data may be transmitted sequentially even during original reading once the confirmation is over.

According to the present embodiment, therefore, erroneous transmission of image data can be prevented upon setting a transmission destination using a transmission destination of previously transmitted data to transmit the image data even if little spare time is given between the start of original reading and the start of data transmission.

Figure 9:
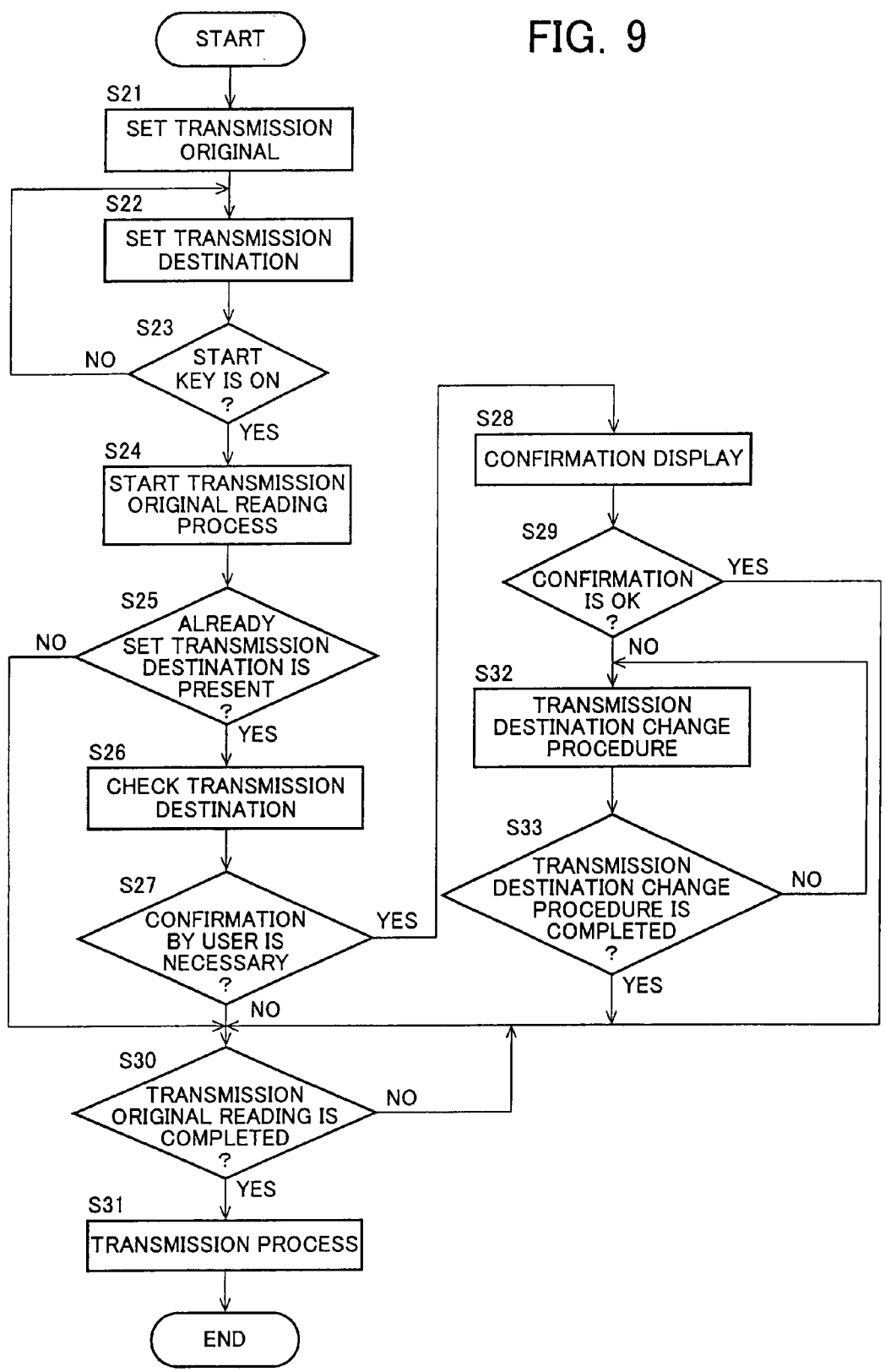
FIG. 9 is a flowchart for explaining an example of an image data transmission process executed by the digital multifunction peripheral of FIG. 1, and also is a flowchart for explaining a process following the process of FIG. 3.

An example of an image data transmission process executed by the digital multifunction peripheral 1 of FIG. 1, which process is a main feature of the present embodiment, will be described with reference to FIGS. 9 to 12. This example may be regarded as a process following the process of FIG. 3, or a process independent of the process of FIG. 3. FIG. 9 is a flowchart for explaining an example of the image data transmission process executed by the digital multifunction peripheral of FIG. 1, and also is a flowchart for explaining a process following the process of FIG. 3. Each of FIGS. 10 to 12 depicts an example of an operation screen accompanying the image data transmission process of FIG. 9 (operation screen on the touch panel).

In the same manner at step S1, when the original detecting sensor 11b detects setting of an original on the original glass plate or on the ADF (step S21), the apparatus carries out automatic specification of a transmission destination and the input portion 12a receives transmission destination setting input (designation) from a user (step S22). The order of steps S21 and S22 is irrelevant here. When the previous transmission destination is held at step S10, automatic setting at step S22 has been done already. When the previous transmission destination is not held at step S11, on the other hand, automatic setting of a new transmission destination is not always necessary. Transmission destination specification by the user at step S22 is, therefore, classified as specification of an additional transmission destination by the user following completion of the automatic setting or as specification of a new transmission destination by the user that is carried out in a state of absence of the automatic setting. User specification is carried out not only by direct input, but the address note registered with and managed by the management portion 17, etc., may be called up to allow the user to select a transmission destination.

The process at step S22 will be described in a case where the address note is called up to allow the user to select a transmission destination. As shown in the setting screen 36 of FIG. 8, when automatic setting of a transmission destination has been done, the user presses the local address note button 40 on the setting screen 36 to add a transmission destination. When the device control portion 14 detects information of the user's pressing the local address button 40, the management portion 17 calls up the address note to display a list of each transmission destination, as shown on the operation screen 23 of FIG. 5. The user is to select the transmission destination from the list. For example, when the user selects "B company fax" 25b as the transmission destination, "B company fax" 25b is highlighted to put an newly added address (fax number) "06-OOOO-xxxx" 43 in display together with the address of the prespecified transmission destination "aaaa@aaa.cp.jp", and a sentence 44 indicating "06-OOOO-xxxx" 43 and "aaaa@aaa.co.jp" are the address of the next transmission comes up, as shown in the operation screen of FIG. 10.

When an original is not set, the display portion 12b displays the indication 34 prompting original setting and pressing of the start key, as shown in the setting screen 45 of FIG. 11. When the original is set at step S21, the indication prompts pressing of the start key only, in which case the address of the current transmission "aaaa@aaa.co.jp;06-OOOO-xxxx" 46 (43) is kept displayed, and a sentence 47 (44) indicating "aaaa@aaa.co.jp;06-OOOO-xxxx" 46 (43) is the address of the next transmission remains as it is.

Selection of a local address note button 48 by the user allows further addition of a transmission destination. For example, when the setting screen of FIG. 10 is displayed again and "C company Internet fax" 25c is selected, an additional address is displayed in such a final form of "aaaa@aaa.co.jp;06-OOOO-xxxx;cccc@ccc.co.jp" in replacement of "aaaa@aaa.co.jp; 06-OOOO-xxxx" 46 on the setting screen of FIG. 11, where the indication 34 prompting (original setting and) pressing of the start key is also displayed.

When the user specifies a new transmission destination in a state of the absence of the automatic setting at step S22, the device control portion 14 causes the display portion 12b to display the initial screen for transmission shown as the operation screen 21 of FIG. 4. On the operation screen 21, the user presses the local address note button 22, and when information of the user's pressing the local address note button 22 is communicated to the device control portion 14, the management portion 17 calls up the address note to display the list of each transmission destination, as shown on the operation screen 23 of FIG. 5. The user is to select the transmission destination from this list.

When the setting at step S22 is completed, the device control portion 14 determines on whether the start key has been pressed (turned on) at the input portion 12a (step S23). When the start key has been pressed, the device control portion 14 instructs the CCD 11a to start reading an original to transmit (step S24).

Subsequently, the device control portion 14 determines on whether an already set transmission destination is present (step S25). This determination brings a result of YES when a new transmission destination is added to the automatically set transmission destination at step S22. When YES results at step S25, the device control portion 14 proceeds to step S26. When NO results at step S25, on the other hand, the device control portion 14 considers a possibility of erroneous transmission of image data to be virtually zero, and proceeds to step S30 or starts data transmission without waiting completion of transmission original reading.

Step S25 is also an instance of a determination criterion used at the above transmission destination determining portion. Specifically, the transmission destination determining portion makes a determination that a possibility of erroneous setting is present when the specifying portion specifies a new transmission destination in addition to a transmission destination set by the automatic setting portion. The determination by the transmission destination determining portion is followed by the confirmation process, by which a leak of transmission information due to erroneous transmission is prevented, which will be described later.

Subsequently, the device control portion 14 checks a transmission destination based on the determination criterion of the transmission destination determining portion (step S26), and determines on whether confirmation of the transmission destination by the user is necessary (step S27).

In using a determination criterion at step S26, the transmission destination determining portion determines that a possibility of erroneous setting is present when at least one of a plurality of transmission destinations set at the transmission destination setting portion is a transmission destination carrying out data transmission through a transmission path different from the transmission paths of other transmission destinations. This determination criterion, however, is effective on the assumption that an apparatus adopting the determination criterion is capable of data transmission through a plurality of transmission paths for different forms of data transmission, as exemplified by the digital multifunction peripheral 1. The transmission destination set on the setting screen 45 of FIG. 11 consists of a transmission destination for Internet fax transmission and another transmission destination for fax transmission, and transmission paths for both transmission destinations are different from each other. In such a case, therefore, a determination is made that the confirmation at step S27 is necessary.

When YES results at step S27, the device control portion 14 controls the display portion 12b to cause it to carry out confirmation display, so that the display portion 12b carries out the confirmation display (step S28). The confirmation display is, for example, made as a setting screen 49 of FIG. 12, which displays "aaaa@aaa.co.jp;06-OOOO-xxxx;cccc@ccc.co.jp" 50, a sentence 51 indicating "aaaa@aaa.co.jp;06-OOOOxxxx;cccc@ccc.co.jp" 50 is the next addresses, and a confirmation message 52. The confirmation message 52 notices that original reading is in progress, and states that a plurality of addresses are set (preferably, in this case, that the types of set transmission destinations are different). The confirmation message 52 carries an OK button 53 and an address cancel button 54 for the user to press so as to be able to receive a response from the user.

In using another determination criterion at step S26, the transmission destination determining portion may determine that a possibility of erroneous setting is present when at least one of plurality of transmission destinations set at the transmission destination setting portion is a transmission destination of data transmission to a transmission area different from other transmission areas. The transmission area mentioned here means the type of a transmission destination, a number or address itself, etc., (e.g., an e-mail address and an IP address means different transmission areas), as described above in connection with determination on execution of the stand-by process. The transmission destination determining portion, as described above in connection with determination on execution of the stand-by process, may also determine that a possibility of erroneous setting is present when a data format for facsimile transmission is adopted based on the data format of image data, and, in the same manner, may also determine that a possibility of erroneous setting is present on the condition that image data is transmitted in pages.

With respect to steps S25 and S26, when two or more transmission destinations are set, whether a combination of the transmission destinations is wrong may be checked, regardless of whether a transmission destination is held. Also, confirmation display may be carried out when data is transmitted to an address outside the office, regardless of whether a transmission destination is already set automatically. In these cases, the process at step S25 is incorporated in the process flow as one of the process of step S26.

Specifically, the determination at step S25 may result in YES when a new transmission destination is added to an automatically set transmission destination, or when no automatically set transmission destination is present but a plurality of transmission destinations are specified by the user (when a transmission destination is specified and then specified again) or a prespecified transmission destination (or the area of the transmission destination), such as a transmission destination outside the office, is included in specified transmission destinations at step S22. In this manner, the transmission destination determining portion should preferably determine that a possibility of erroneous setting is present when a plurality of set transmission destinations are present. When a plurality of transmission destinations are specified, confirmation of the transmission destinations is required at step S28. Determining the presence of a possibility of erroneous setting when a new transmission destination is added to an automatically set transmission destination, as described at step S25, is included after all in determining the presence of a possibility of erroneous setting when a plurality of transmission destinations are set.

Following step S28, the device control portion 14 determines on whether the confirmation is OK (step S29), and proceeds to step S30 when detecting pressing of the OK button 53, while proceeds to step S32 when detecting pressing of the address cancel button 54.

At step S32, the device control portion 14 accepts and executes a transmission destination change procedure, and proceeds to step S33, and then proceeds to step S30 at the point that the transmission destination change procedure is completed (YES at step S33). At step S32, for example, the setting screen 23 of FIG. 5 is displayed again, and the transmission destination change procedure is completed based on the user's specification of a transmission destination.

At step S30, the device control portion 14 determines on whether original reading is completed, and starts the transmission process on read image data at the point of completion of original reading at step S30 (step S31). At step S30, when Internet fax is selected, Internet facsimile transmission is carried out, and when a transmission destination for another transmission form is selected, transmission corresponding to the selected transmission form is carried out. The device control portion 14 then determines on whether the transmission process is completed, and ends a series of processes following the completion of the transmission process. When NO results at step 25, the device control portion 14 ends the series of processes after completing processes at steps S30 and S31.

The transmission control portion should preferably cause the image transmitting portion to transmit stored image data to a transmission destination (or transmission destinations) only when the confirming portion has obtained a confirmation of the transmission destination at the point of completion of image reading by the image reading portion 11. In other words, the transmission control portion should preferably forbid data transmission when the confirmation has not been obtained at the point of completion of image reading, in which case the user returns to a certain stage of operation to carry out the data transmission process again. In the data transmission process, having obtained the image data, the user reads out the obtained image data and specifies the transmission destination to transmit the image data.

In carrying out the determination process at step S29 in the course of the image data transmission process, the transmission control portion should preferably wait for confirmation of a transmission destination at the confirming portion even after completion of image reading by the image reading portion 11 and then cause the image transmitting portion to execute transmission of stored image data to those transmission destination. This means that transmission control portion should preferably not allow data transmission even after completion of reading of a transmission original, but allow transmission of the stored image data to the transmission destination upon obtaining the confirmation.

While the description centering on the image data transmission apparatus of the present embodiment has been made with reference to FIGS. 1 to 12, the present embodiment may be provided also in the form of a program, which is exemplified by the control program in the device control portion 14. This program is installed in the control portion (such a storing portion as ROM in the control portion) of the image data transmission apparatus to cause the control portion (processing unit of the control portion) to execute the above procedure of the present embodiment. In other words, this program causes the control portion of the image data transmission apparatus to function as the above transmission destination determining portion, confirming portion, and transmission control portion. The control portion of the image data transmission apparatus is the portion that is equivalent to an internal computer of the image data transmission apparatus. The confirming portion is, as described above, incorporated in an executable manner as a program related to control over the display portion 12b and the input portion 12a. These programs may be distributed through a computer-readable recording medium having the programs recorded thereon or via a network. The recording medium has been described in the first embodiment.

According to the present embodiment, the image data transmission apparatus is capable of preventing erroneous transmission of image data upon setting a transmission destination using a transmission destination of previously transmitted data to transmit the image data even if little spare time is given between the start of original reading and the start of data transmission.

The invention claimed is:

1. A data transmission apparatus transmitting data to a transmission destination indicated by specified transmission destination information via a network, comprising:
   a holding portion holding the specified transmission destination information; and
   a control portion controlling the holding portion to cause the holding portion to keep holding the transmission destination information even after completion of transmission of the data based on the transmission destination information and stand by in a state of being capable of subsequently transmitting different data to the same transmission destination, wherein
   the data transmission apparatus being capable of data transmission through a plurality of transmission paths for data transmission forms different from each other,
   the plurality of transmission paths include a transmission path for data transmission in pages, and a transmission path for data transmission in a form of one file containing data of a plurality of pages,
   the control portion determines whether or not to permit holding of the transmission destination information by the holding portion based on contents of transmission of the data based on the transmission destination information, and
   the control portion forbids holding of the transmission destination information by the holding portion based on a transmission path for the data.

2. A data transmission apparatus transmitting data to a transmission destination indicated by specified transmission destination information via a network, comprising:
   a holding portion holding the specified transmission destination information; and
   a control portion controlling the holding portion to cause the holding portion to keep holding the transmission destination information even after completion of transmission of the data based on the transmission destination information and stand by in a state of being capable of subsequently transmitting different data to the same transmission destination, wherein
   the data transmission apparatus being capable of data transmission through a plurality of transmission paths for data transmission forms different from each other,
   the plurality of transmission paths include a transmission path for data transmission in pages, and a transmission path for data transmission in a form of one file containing data of a plurality of pages,
   the control portion determines whether or not to permit holding of the transmission destination information by the holding portion based on contents of transmission of the data based on the transmission destination information,
   the control portion forbids holding of the transmission destination information by the holding portion based on a transmission path for the data, and
   the control portion forbids holding of the transmission destination information by the holding portion on condition that the transmission path for data transmission in pages is used.

3. A data transmission apparatus transmitting data to a transmission destination indicated by specified transmission destination information via a network, comprising:
   a holding portion holding the specified transmission destination information; and
   a control portion controlling the holding portion to cause the holding portion to keep holding the transmission destination information even after completion of transmission of the data based on the transmission destination information and stand by in a state of being capable of subsequently transmitting different data to the same transmission destination, wherein
   the control portion determines whether or not to permit holding of the transmission destination information by the holding portion based on contents of transmission of the data based on the transmission destination information, and
   the control portion forbids holding of the transmission destination information by the holding portion on condition that the data is processed in pages.

4. A program embodied in a computer-readable recording medium and installed in the data transmission apparatus of any one of claims 3, 1, and 2, the program operable to drive an internal computer of the data transmission apparatus to function as the control portion.

5. An image data transmission apparatus comprising:
   an image reading portion reading an image from an original to generate image data;
   a storing portion having stored thereon the read image data;
   a transmission destination setting portion setting a transmission destination of the stored image data;
   an image transmitting portion transmitting the stored image data to the set transmission destination via a network;
   a transmission destination determining portion determining presence or absence of a possibility that the transmission destination set at the transmission destination setting portion is an erroneously set transmission destination;
   a confirming portion that, after start of image reading by the image reading portion, requires a user to make a confirmation of correct setting of the transmission destination only when a result of the determination by the transmission destination determining portion indicates the presence of possibility of erroneous setting; and
   a transmission control portion controlling the image transmitting portion after the confirmation at the confirming portion to cause the image transmitting portion to transmit the image data stored on the storing portion to the transmission destination.

6. The image data transmission apparatus of claim 5, wherein
   the transmission control portion causes the image transmitting portion to transmit the image data stored on the storing portion to the transmission destination only when the confirmation at the confirming portion is obtained at a point of completion of image reading by the image reading portion.

7. The image data transmission apparatus of claim 5, wherein
   the transmission control portion waits for the confirmation at the confirming portion even after completion of image reading by the image reading portion, and then causes the image transmitting portion to transmit the image data stored on the storing portion to the transmission destination.

8. The image data transmission apparatus of claim 5, wherein
   the transmission destination determining portion determines that a possibility of erroneous setting is present when a plurality of transmission destinations are set at the transmission destination setting portion.

9. The image data transmission apparatus of claim 8, wherein the transmission destination setting portion has a specifying portion that sets a transmission destination through specification by a user, and an apparatus side specifying portion that sets a transmission destination through specification by the image data transmission apparatus side without depending on specification at the specifying portion, and wherein the transmission destination determining portion determines that a possibility of erroneous setting is present when a new transmission destination is set at the specifying portion in addition to a transmission destination set at the apparatus side specifying portion.

10. The image data transmission apparatus of claim 9, wherein the apparatus side specifying portion has a stand-by portion that holds a transmission destination of data already transmitted before and that stands by in a state of being capable of subsequently transmitting different data to the same transmission destination, and specifies the same transmission destination as the stand-by portion stands by.

11. The image data transmission apparatus of claim 10, wherein the stand-by portion permits or forbids the holding of the transmission destination based on contents of transmission of data based on the transmission destination to hold.

12. The image data transmission apparatus of claim 8, being capable of data transmission through a plurality of transmission paths for data transmission forms different from each other, wherein the transmission destination determining portion determines that a possibility of erroneous setting is present when at least one of a plurality of transmission destinations set at the transmission destination setting portion is a transmission destination carrying out data transmission through a transmission path different from transmission paths of other transmission destinations.

13. The image data transmission apparatus of claim 8, wherein the transmission destination determining portion determines that a possibility of erroneous setting is present when at least one of a plurality of transmission destinations set at the transmission destination setting portion is a transmission destination of data transmission to a transmission area different from other transmission areas.

14. A program embodied in a computer-readable recording medium and installed in the image data transmission apparatus of claim 5, the program operable to drive an internal computer of the image data transmission apparatus to function as the transmission destination determining portion, the confirming portion, and the transmission control portion.

* * * * *